United States Patent
Reese

(10) Patent No.: US 8,116,443 B1
(45) Date of Patent: Feb. 14, 2012

(54) AUTOMATIC CALLBACK AND CALLER ID METHOD AND SYSTEM

(76) Inventor: Morris Reese, Westlake Village, CA (US)

(*) Notice: Subject to any disclaimer, the term of this patent is extended or adjusted under 35 U.S.C. 154(b) by 378 days.

(21) Appl. No.: 12/587,823

(22) Filed: Oct. 14, 2009

(51) Int. Cl.
*H04M 3/42* (2006.01)

(52) U.S. Cl. .............................. 379/210.01; 379/207.02

(58) Field of Classification Search ............. 379/207.02, 379/210.01
See application file for complete search history.

(56) References Cited

U.S. PATENT DOCUMENTS

| | | |
|---|---|---|
| 4,277,649 A | 7/1981 | Sheinbein |
| 4,551,581 A | 11/1985 | Doughty |
| 4,582,956 A | 4/1986 | Doughty |
| 4,873,719 A | 10/1989 | Reese |
| 4,899,358 A | 2/1990 | Blakley |
| 4,922,490 A | 5/1990 | Blakley |
| 4,930,152 A | 5/1990 | Miller |
| 5,185,782 A | 2/1993 | Srinivasan |
| 5,263,084 A | 11/1993 | Chaput et al. |
| 5,289,530 A | 2/1994 | Reese |
| 5,371,781 A | 12/1994 | Ardon |
| 5,613,006 A | 3/1997 | Reese |
| 5,619,561 A | 4/1997 | Reese |
| 5,671,269 A | 9/1997 | Egan et al. |
| 6,061,432 A | 5/2000 | Wallace et al. |
| 6,195,418 B1 | 2/2001 | Ridgley |
| 6,427,009 B1 | 7/2002 | Reese |
| 6,590,965 B1 | 7/2003 | Poole et al. |
| 6,618,474 B1 | 9/2003 | Reese |
| 6,711,248 B1 | 3/2004 | Haber et al. |
| 6,868,150 B1 | 3/2005 | Reese |
| 6,970,544 B1 | 11/2005 | Reese |
| 2010/0158220 A1* | 6/2010 | Silverman ................ 379/88.22 |

OTHER PUBLICATIONS

Bell Communications, "Caller Identification With Call Waiting", RFI 91-03, Apr. 1991.
Bellcore, "Calling Identity Delivery on Call Waiting", TR-NWT-000575, Issue 1, Oct. 1992.
Bellcore, Calling Number Delivery, TR-TSY-000031, Issue 3, Jan. 1990.
Bellcore, "Call Waiting Deluxe", GR-416-CORE, Issue 1, Apr. 1995.
Bell Core, "Call Waiting", TR-TSY-000571, Issue 1, Oct. 1989.

* cited by examiner

*Primary Examiner* — Rasha Al Aubaidi

(57) ABSTRACT

The method of the present invention allows a voice mail recipient to activate an automatic callback to a previous caller whose calling telephone number and recorded voice message have been left in the voice mail recipient's mailbox associated with a voice mail system coupled to an end office switch which serves the voice mail recipient. More particularly, the method of the present invention automatically delivers to the previous caller's busy or idle station caller identifying information (i.e., a directory telephone number (DN) and/or name) related to the voice mail recipient after the voice mail recipient activates the automatic callback to the previous caller by pressing a predetermined digit on a keypad of an apparatus at the voice mail recipient's station, or by saying a predetermined voice command, in response to an audible prompt from the voice mail system while or after listening to a verbal announcement of the previous caller's calling telephone number and recorded voice message left in the voice mail recipient's mailbox.

32 Claims, 6 Drawing Sheets

AUTOMATIC CALLBACK AND CALLER ID METHOD AND SYSTEM

FIELD OF THE INVENTION

The present invention relates to an improved method and system which allows a voice mail recipient to activate an automatic callback to a previous caller whose calling telephone number and recorded voice message have been left in the voice mail recipient's mailbox, and more particularly to an improved method and system for automatically delivering to the previous caller's busy or idle station caller identifying information related to the voice mail recipient after the voice mail recipient activates the automatic callback to the previous caller.

BACKGROUND OF THE INVENTION

Many voice mail systems today provide some information about the call with the stored audio signal. This voice mail identification is normally associated with the telephone number of the voice mail subscriber. As the ability to send return messages is a normal and expected attribute of voice mail communication, data message protocol provides for message headings to include both sending and receiving addresses. Thus, in conventional systems, the receiving voice mailbox typically gains access to the calling number information as part of its processing of each incoming call. If received, the voice mail system stores the calling number and will announce that number to the subscriber during message retrieval and/or related mailbox access operations. The information may also be used to enable call-back to the party that left the message for the subscriber or for forwarding of a newly recorded message from the subscriber to a mailbox of the original calling party.

U.S. Pat. No. 6,061,432 to Wallace et al., discloses a voice mail system with signaling connectivity to the interoffice signaling portion of the switched telephone network. This enables the voice mail system to query other network nodes such as an end office switch or an intelligent signaling transfer point to obtain routing information used to forward a reply message to an appropriate box of the original caller in a remote voice mail system.

U.S. Pat. No. 6,711,248 to Haber et al., describes an improved telephone/answering machine system which is capable of enabling an automatic callback to a calling telephone number whose caller has left a recorded message. In response to a received call, an identifier of the calling telephone is stored along with the message from the caller. Thereafter, the called party is enabled to play the message left by the caller and is further to enter a callback signal during the playing of the message. This action causes the message playback to be interrupted, the identifier to be recalled from memory and used to automatically place a call to the calling telephone whose message was interrupted.

Other developments in the known voice mail systems enable the calling party's telephone number to be extracted from the data transmitted by the telephone system in connection with the call. For example, U.S. Pat. No. 5,671,269 to Egan, et al., describes a telephone communication apparatus that includes equipment which detects a calling party's telephone number (i.e., the calling number). The calling number is then stored in a data storage unit, along with a recorded message from the calling party. The recipient (i.e., the called party) of the message retrieves the message and the stored calling number.

The provision of automatic callback arrangements is known in the prior art. U.S. Pat. No. 5,185,782 to Srinvasan describes a callback arrangement for an automatic call distribution system which collects and stores the telephone numbers from which calls are incoming, estimates how long each call will have to hold in cue before being answered and, if the waiting time exceeds a predetermined maximum, prompts the caller to choose between holding or receiving a return call. If the caller chooses a return call, the system prompts the caller for a callback time and time period. Thereafter, the system places an outgoing call to the stored telephone number when the callback time arrives. This action is repeated, periodically, until the call is either answered or a callback time period expires.

U.S. Pat. No. 4,930,152 to Miller provides a telephone customer with access to a memorized list of calls which the customer had previously been unable to answer. When an incoming call is not answered, the caller's number is entered on the customer's callback list after being advised by a recorded message to enter, via the DTMF keyboard, the caller's number. The customer is later advised of the calling numbers and is then able to signal for automatic placement of a return call.

U.S. Pat. No. 6,195,418 to Ridgley describes a telephone system having a callback capability and method for connecting a recipient of a message to a caller. A calling party initiates a telephone call from the calling unit. The telephone call is coupled to a called unit. If the telephone call is not answered at the called unit, a message delivery system prompts the calling party at the calling unit to leave a voice message for the called party. In response to the prompt, the calling party provides a voice message to the message delivery system. The calling party's telephone number and the voice message associated with the calling party's telephone number are stored in a storage device. When a message recipient (i.e., the called party) desires to retrieve messages from the message delivery system, the message recipient activates the called unit to call a telephone number associated with the message delivery system. The message delivery system answers the call and prompts the message recipient for input. The message recipient may then activate a callback feature by, for example, pressing a first predetermined sequence of digits (e.g., "1" "1" "3", etc.) on the touch-tone keypad of the called unit. After the callback feature is activated, the message delivery system identifies that the called unit is requesting the voice message assigned to the called unit. At the same time, an information decoder receives and decodes the telephone number of the called unit, which may then be stored in the storage device by the processor. The processor then retrieves the voice message originated by calling unit, and replays the voice message to the message recipient, e.g., using a voice response unit. After playing the message, the message delivery system prompts the message recipient with an option to automatically call back the calling party by pressing a second predetermined key sequence (e.g., "*"). If the recipient presses this second predetermined key sequence, the message delivery system retrieves the calling party's telephone number (associated with the voice message) and directs the telecommunications switch to connect the return call from the called unit to the calling unit.

It is therefore an object of this invention to provide an improved method and system wherein a voice mail recipient while or after listening to a verbal announcement of a calling telephone number including a recorded voice message of a previous caller left in the voice mail recipient's mailbox, is allowed to activate an automatic callback to the previous caller without disconnecting from voice mail.

It is another object of this invention to provide an improved method and system for automatically delivering to the previous caller's busy or idle station identifying information (i.e., a directory telephone number (DN) and/or a name, a city, a state, or both a city and a state)) related to the voice mail recipient after the voice mail recipient activates the automatic callback to the previous caller.

SUMMARY OF THE INVENTION

The method of the invention allows a voice mail recipient (i.e., a called party) to activate an automatic callback to a caller (i.e. a previous caller) whose calling telephone number (sometimes referred to herein as "destination directory number") and recorded voice message have been left in the called party's mailbox associated with a voice mail system coupled to an end office switch (i.e., a Stored Program Controlled Switching System (SPCS)) which serves the called party.

In an embodiment of the present invention, the called party after accessing the voice mail system, and while or after listening to a verbal announcement of the previous caller's calling telephone number and recorded voice message left in the called party's mailbox associated with the voice mail system, activates the automatic callback to the previous caller by saying a predetermined voice command, or by pressing a predetermined digit (e.g., "2") on a keypad of an apparatus at the called party's station, in response to an audible prompt from the voice mail system coupled to the SPCS which serves the called party.

The voice mail system responds to the spoken voice command, or to the predetermined digit pressed on the keypad of the apparatus at the called party's station, by sending from the called party's mailbox associated with the voice mail system stored data representative of the previous caller's calling telephone number and the called party's directory telephone number (DN) and/or name via a of links to the SPCS of the called party.

The SPCS of the called party after receiving the data representative of the previous caller's calling telephone number and the called party's DN and/or name from the voice mail system, disconnects from the voice mail system and connects audible ringing signals to the called party's line, translates area and office codes of the calling telephone number of the previous caller into appropriate routing information to select a trunk line which is an appropriate route to an end office switch (i.e., a Stored Program Control Switching System (SPCS)) of the previous caller, generates an Initial Address Message which includes the previous caller's calling telephone number and the called party's DN, and then transmits the IAM message through the Public Switched Telephone Network (PSTN) to the SPCS of the previous caller.

The SPCS of the previous caller after receiving the IAM message containing the previous caller's calling telephone number and the called party's DN flagged as "public" from the SPCS of the called party via the PSTN, stores the received IAM in a call store of the SPCS, sends an alerting sequence (the Subscriber Alerting Signal (SAS)) and the CPE Alerting Signal (CAS) to the previous caller's in-use line associated with the received calling telephone number, which the previous caller recognizes as the "call waiting tone" or a "waiting caller", since conventional "call waiting ID" service (sometimes also referred to as "caller ID with call waiting" service) is assigned to the previous caller's in-use line, and then transmits the called party's DN from the call store to the previous caller's in-use station after an apparatus at the in-use station mutes its own voice channel and generates an acknowledge tone signal in response to the CPE Alerting Signal.

The apparatus (i.e., a telephone or any other known sending and receiving device) at the previous caller's in-use station receives and displays the called party's DN and/or name or other identifying information (i.e., a city, a state, or both a city and a state) transmitted from the SPCS of the previous caller and subsequently stores the received DN and/or name or other identifying information to memory for later recall and display.

In another embodiment of the present invention, the SPCS of the previous caller after receiving the IAM message containing the previous caller's calling telephone number and the called party's DN flagged as "public", which indicates that the called party's DN is to be disclosed at the previous caller's idle or busy station, from the SPCS of the called party via the PSTN, stores the received IAM message in the call store of the SPCS, connects audible ringing signals to the previous caller's idle line associated with the received calling telephone number, which the previous caller recognizes as a normal "incoming call", since conventional caller ID is assigned to the idle line, and then transmits the called party's DN from the call store to an apparatus at the previous caller's idle station between the ringing signals, preferably between the first and second ringing signals.

The apparatus (i.e., a telephone or any other known sending and receiving device) at the previous caller's idle station receives and displays the called party's DN and/or name or other identifying information (i.e., a city, a state or both a city and a state) transmitted from the SPCS of the previous caller between the ringing signals and subsequently stores the received DN and/or name or other identifying information to memory for later recall and display.

In yet another embodiment of the present invention, the end office switch, i.e., a Wireless Communication Switch (WCS), of the previous caller after receiving the IAM message containing the called party's DN and/or name and the previous caller's calling telephone number (sometimes referred to herein as the "destination directory number") from the SPCS of the called party, determines which Wireless Communication Device (WCD), which may be a cellular car telephone, a cellular mobile telephone or any known digital or analog receiving and sending device known in this particular art, this call is for by performing a table lookup using the destination directory number of the previous caller. After determining that the destination directory number is associated with WCD "571-1234", sending a paging message to all cell sites within the WCS to cause the cell sites to determine if WCD "571-1234" is active in the WCS and, if so, which cell is the best serving cell.

In response to the page message, WCD "571-1234" sends a page response message, as is known in the art. In this particular example, WCD "571-1234" is located in cell site 1. Cell site 1 receives the page response message from WCD "571-1234" and forwards it to the WCS which, in turn, sends a message to WCD "571-1234" informing it that a radio channel has been assigned to cell site 1. An acknowledgement message is sent back from WCD "571-1234" to cell site 1. A message is then sent to WCD "571-1234" to start ringing, which the previous caller recognizes as an incoming call.

After WCD "571-1234" is informed that the radio channel has been assigned, an analog encoded signal such as dual-tone multifrequency (DTMF) encoding of the received DN at the WSC is delivered to WCD "571-1234" over the radio communication channel. The received analog encoded DN is then translated (decoded) back into digits and/or alpha numeric characters identifying the called party's DN or city and/or state, etc., and displayed on a display at WCD "571-1234" and then subsequently stored in memory for later recall and display. It is to be understood that frequency shift key (FSK) signaling, DTMF signaling, as well as any other signaling methods known in the art could be used for this invention.

In still yet another embodiment of this invention, call waiting in combination with caller ID (sometimes referred to as "call waiting ID" or "caller ID with call waiting") for Wireless Communication Switches and Wireless Communication Devices may be implemented by using the present invention to uniquely deliver caller identifying information related to a called party (i.e., a voice mail recipient) to a previous caller who has left a calling telephone number (destination directory number) and a recorded voice message in the voice mail recipient's voice mailbox associated with a voice mail system after the voice mail recipient activates an automatic callback to the previous caller in response to an audible prompt (announcement) from the voice mail system while or after listening to a verbal announcement of the destination directory number including the recorded voice message of the previous caller that are stored in the voice mail recipient's mailbox associated with the voice mail system. For example, when a call comes in to the WCS for the destination directory number associated with WCD "571-1234" of the previous caller, and WCD "571-1234" is already busy on another call, the WCS sends a call waiting alert to WCD "571-1234" on an assigned signaling channel, which causes it to generate a call waiting tone signal. At approximately the same time the voice mail recipient's DN is delivered to WCD "571-1234", which then receives and displays the delivered DN on its display and subsequently stores the received DN to memory for later recall and display.

BRIEF DESCRIPTION OF THE DRAWINGS

A more complete understanding of the invention may be obtained from the following description and the accompanying drawings in which.

DETAILED DESCRIPTION

Figure 1A:
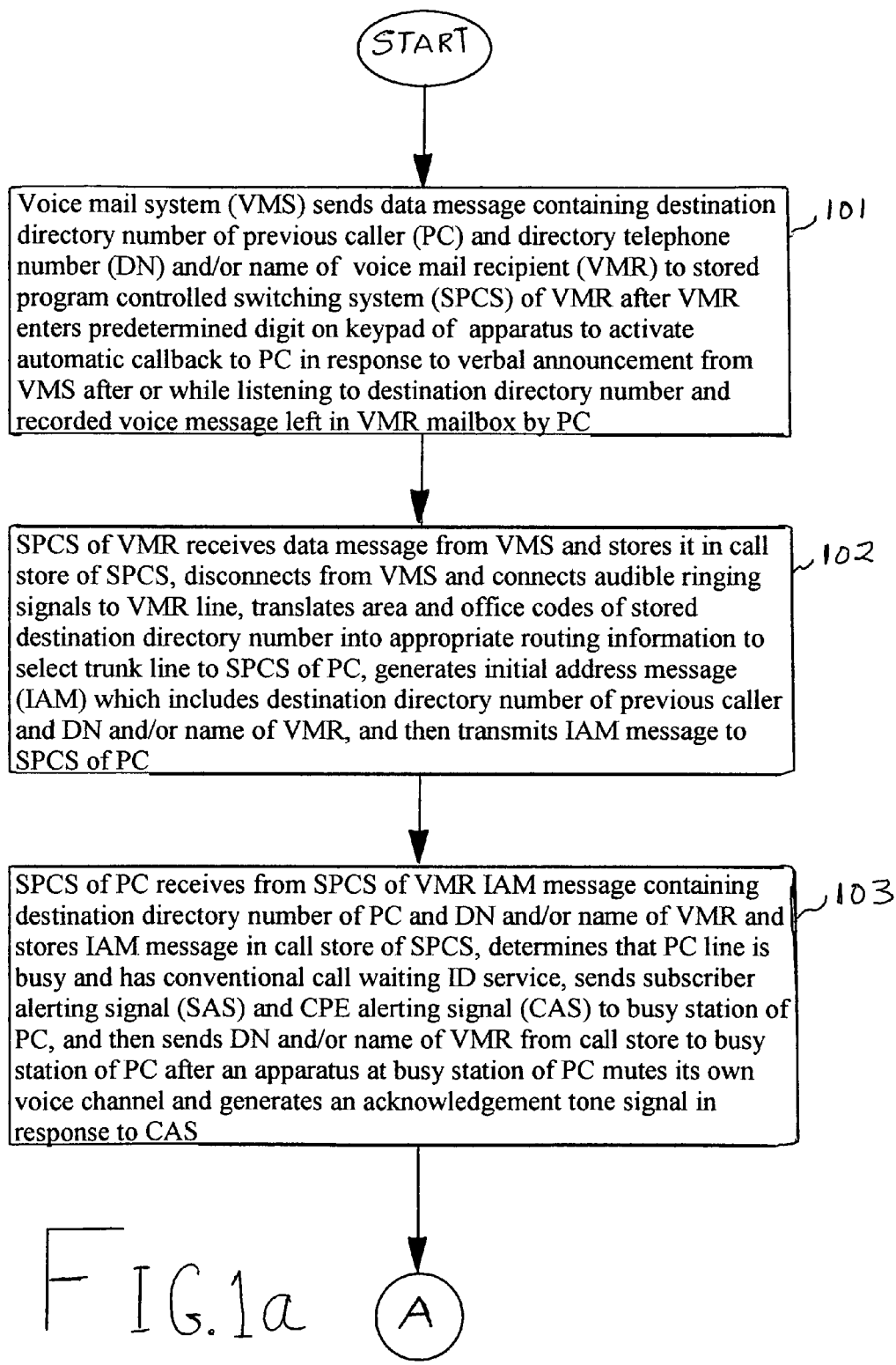
FIG. 1a and FIG. 1b shows, in flow chart form, an embodiment of the present invention.

As illustrated in FIG. 1a, (step 100) a voice mail recipient (i.e., a called party) activates an automatic callback to a previous caller by pressing a predetermined digit (e.g., "2") on a keypad of an apparatus (e.g., 504 of FIG. 5) at the voice mail recipient's station, or by saying (speaking) a predetermined voice command, in response to an audible prompt (announcement) from a voice mail system (e.g., 503 of FIG. 5) connected via a pair of links (e.g., 510 of FIG. 5) to a SPCS (e.g., 500 of FIG. 5) which serves the voice mail recipient while or after listening to a verbal announcement of the calling telephone number (destination directory number) and a recorded voice message of the previous caller stored in the voice mail recipient's mailbox (not shown) associated with the voice mail system.

At step 101, the voice mail system responds to the predetermined digit pressed on the keypad of the apparatus, or to the spoken voice command, by sending to the SPCS of the voice mail recipient via the links a data message containing the previous caller's destination directory number and the voice mail recipient's directory telephone number (DN) and/or name.

At step 102, the SPCS associated with the voice mail recipient after receiving the data message representative of the destination directory number of the previous caller and the voice mail recipient's DN and/or name flagged as "public" from the voice mail system, disconnects from the voice mail system and connects audible ringing signals to the voice mail recipient's line, translates area and office codes of the received destination directory number of the previous caller into appropriate routing information to select a trunk line which is an appropriate route to either a SPCS (e.g., 501 of FIG. 5) associated with the previous caller or to a Wireless Communication Switch (e.g., 507 of FIG. 5) associated with the previous caller, generates an Initial Address Message which includes the previous caller's destination directory number and the voice mail recipient's DN and/or name flagged as "public", and then transmits the IAM message through the Public Switched Telephone Network (PSTN) (e.g., 502 of FIG. 5) to the SPCS associated with the previous caller.

Figure 1B:
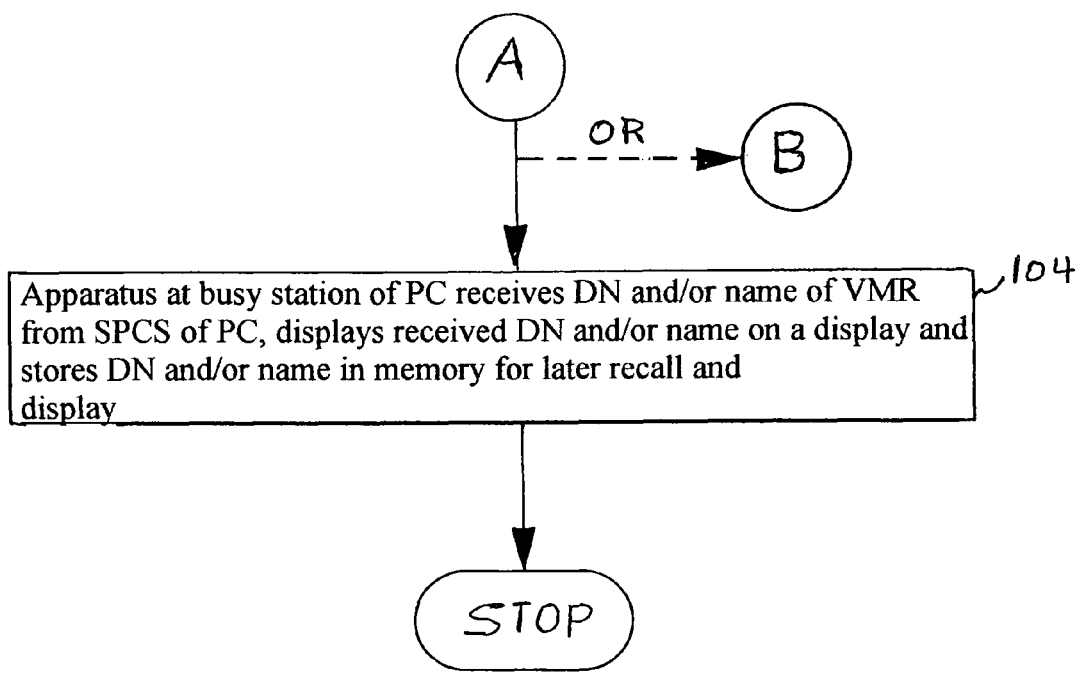

As illustrated in FIG. 1b, (step 103) the SPCS associated with the previous caller after receiving the IAM message containing the previous caller's destination directory number and the voice mail recipient's DN and/or name flagged as "public" (which indicates that the DN and/or name is to be disclosed at the previous caller's busy station), from the SPCS associated with the voice mail recipient via the PSTN, stores the received IAM message in the call store (not shown) of the SPCS, sends an alerting sequence (the Subscriber Alerting Signal (SAS) and the CPE Alerting Signal (CAS)) toward the previous caller's busy station, which the previous caller recognizes as a "call waiting tone signal" or a "waiting caller", since conventional "call waiting ID" service (sometimes referred to in the art as "caller ID with call waiting" service) is assigned to the previous caller's busy line, and then transmits the voice mail recipient's DN and/or name from the call store to the previous caller's busy station after an apparatus at the busy station mutes its own voice channel and generates an acknowledge tone signal in response to the CPE Alerting Signal.

At step 104, the apparatus at the previous caller's busy station receives and displays in a display (not shown) the voice mail recipient's DN and/or name transmitted from the SPCS associated with the previous caller and subsequently stores the received DN and/or name in memory (not shown) for later recall and display.

Figure 5:
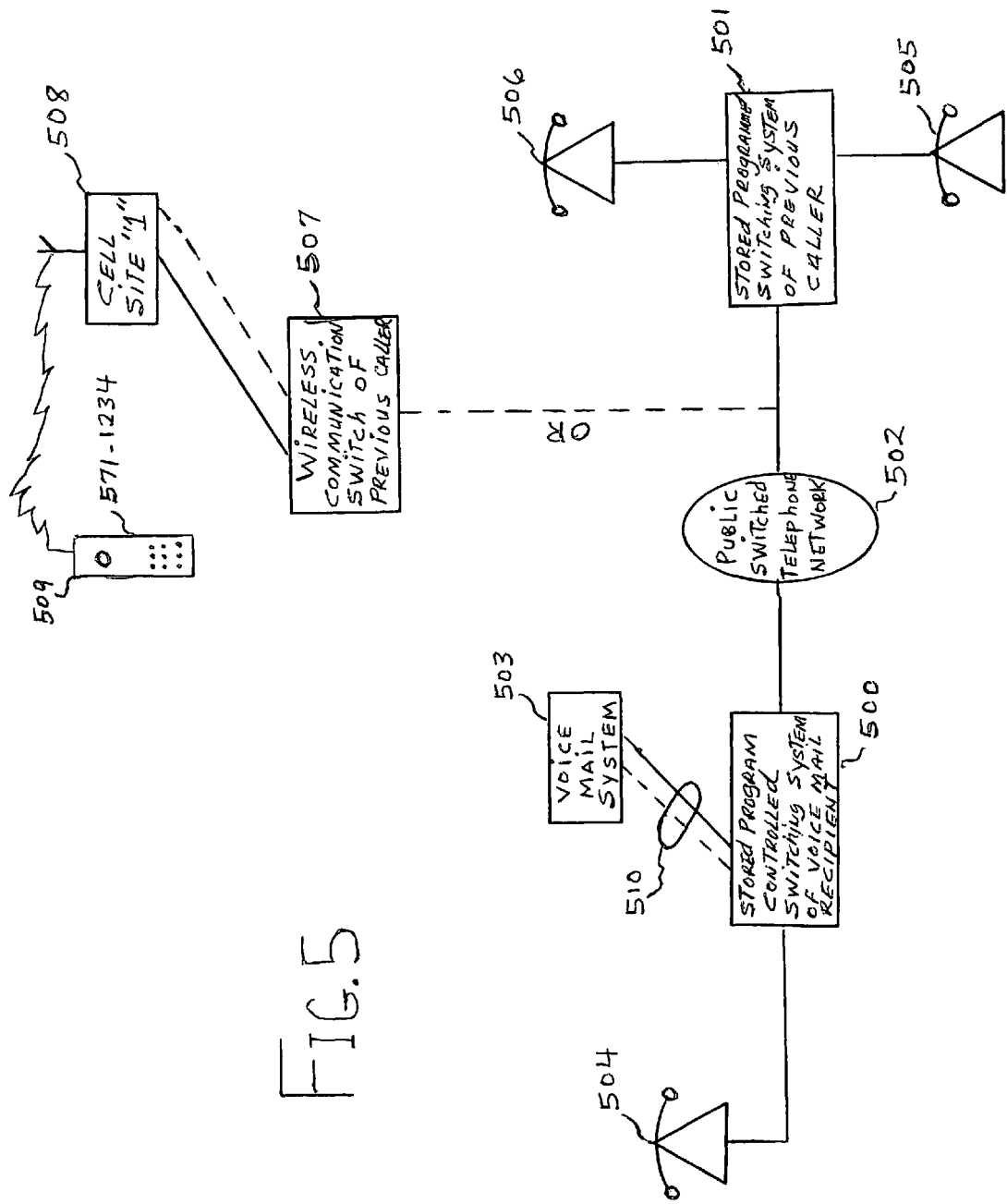
FIG. 5 shows, in block diagram form, a representation of a telephone and/or a cellular network in which the present invention may be implemented.

It is to be understood that the previous caller at station 505 of FIG. 5 is already engaged in an ongoing telephone conversation with another caller at station 506 of FIG. 5 when the voice mail recipient's DN and/or name flagged as "public" is received at the SPCS associated with the previous caller from the SPCS associated with the voice mail recipient. It is also to be understood that If, during the audible ringing (see step 102 of FIG. 1a above) to the voice mail recipient's station, it is confirmed that an answering response has been detected on the previous caller's busy line because the previous caller answered the voice mail recipient's automatic return call after hearing the Subscriber Alerting Signal on its busy line (see step 103 of FIG. 1b above), a normal communication connection between the voice mail recipient and the previous caller prevails.

Figure 2:
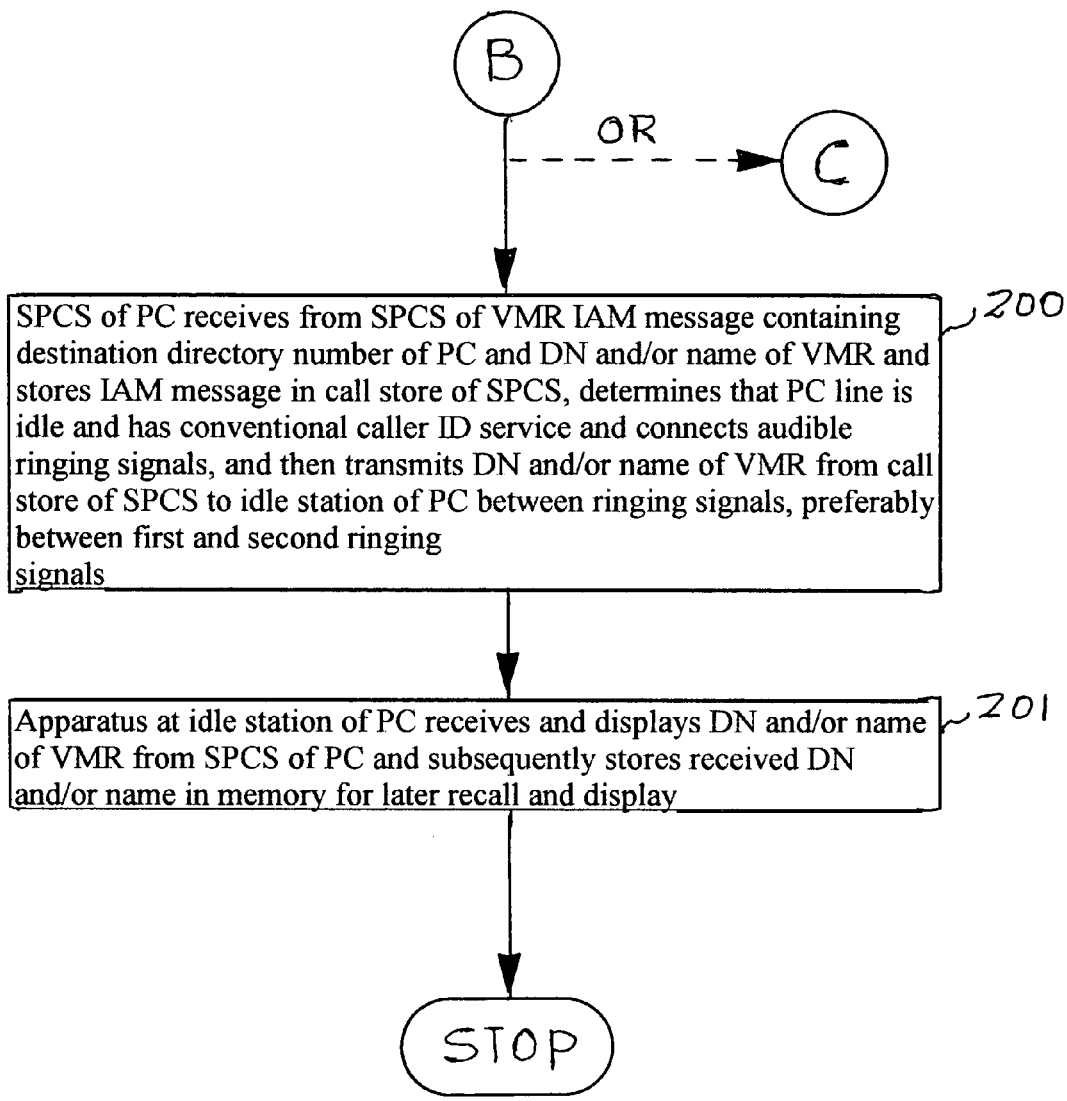
FIG. 2 shows, in flow chart form, another embodiment of the present invention.

As illustrated in FIG. 2, (step 200) the SPCS associated with the previous caller after receiving the IAM message containing the voice mail recipient's DN and/or name flagged as "public" along with the previous caller's destination directory number from the SPCS associated with the voice mail recipient via the Public Switched Telephone Network, stores the received IAM in the call store of the SPCS, connects audible ringing signals to the previous caller's idle line associated with the received destination directory number and then, transmits the DN and/or name of the voice mail recipient from the call store of the SPCS to an apparatus at the previous caller's idle station between the ringing signals, preferably between the first and second ringing signals.

At step 201, the apparatus at the previous caller's idle station receives and displays on a display (not shown) the voice mail recipient's DN and/or name transmitted from the SPCS and subsequently stores the received DN and/or name in memory (not shown) for later recall and display.

It is to be understood that if, during the audible ringing to the voice mail recipient's idle station (see step 102 of FIG. 1*a* above), it is confirmed that an answering response has been detected on the previous caller's idle line because the previous caller answered the automatic return call from the voice mail recipient after hearing the audible ringing at the previous caller's idle station (see step 200 of FIG. 2 above), a normal communication connection between the voice mail recipient and the previous caller prevails.

Figure 3:
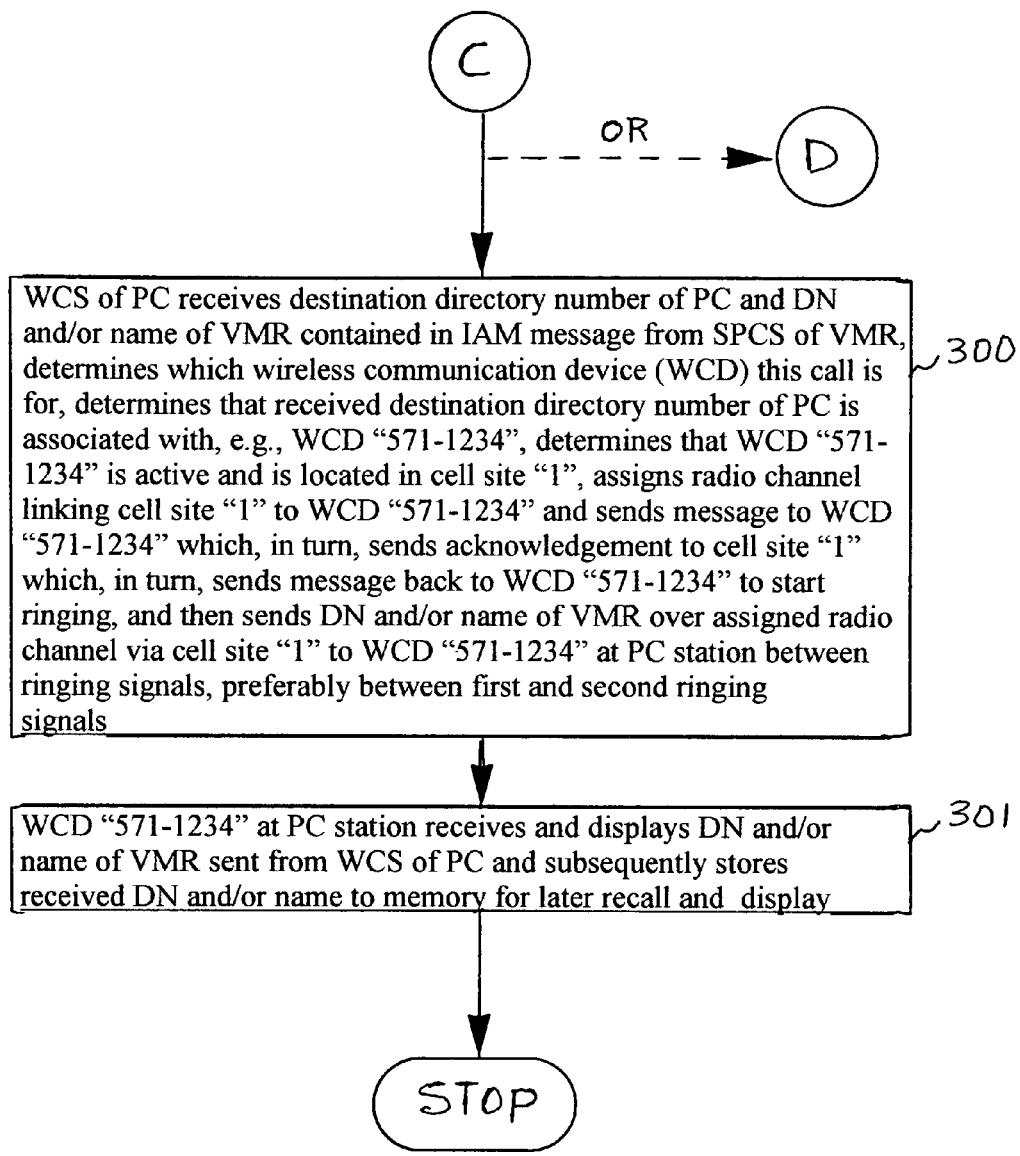
FIG. 3 shows, in flow chart form, yet another embodiment of the present invention.

As illustrated in FIG. 3, step 300 the Wireless Communication Switch (WCS) (e.g., 507 of FIG. 5) receives the destination directory number of the previous caller and the DN and/or name of the voice mail recipient contained in the IAM message from the SPCS of the voice mail recipient via the Public Switched Telephone Network (PSTN), determines which Wireless Communication Device (WCD) this call is for by performing a table lookup using the received destination directory number, determines that the received destination directory number of the previous caller is associated with, e.g., WCD "571-1234", determines that WCD "571-1234" is active and is located in, e.g., cell site "1", assigns a radio channel linking the cell site "1" to WCD "571-1234" and sends a message to WCD "571-1234" which, in turn, sends an acknowledgement to cell site "1" which, in turn, sends a message back to WCD "571-1234" to start ringing, and then sends the DN and/or name of the voice mail recipient over the assigned radio channel via cell site "1" to WCD "571-1234" at the previous caller idle station between ringing signals, preferably between first and second ringing signals.

At step (301) WCD "571-1234" at the previous caller station receives and displays the DN and/or name of the voice mail recipient sent from the WCS of the previous caller between the ringing signals and subsequently stores the received DN and/or name to memory (not shown) for later recall and display.

It is to be understood that if, during ringing of WCD "571-1234" (see step 301 of FIG. 3 above), it is confirmed that an answering response has been detected at WCD "571-1234" because the previous caller answered the automatic return call from the voice mail recipient after hearing the ringing at WCD "571-1234", a normal communication connection between the voice mail recipient and the previous caller prevails.

Figure 4:
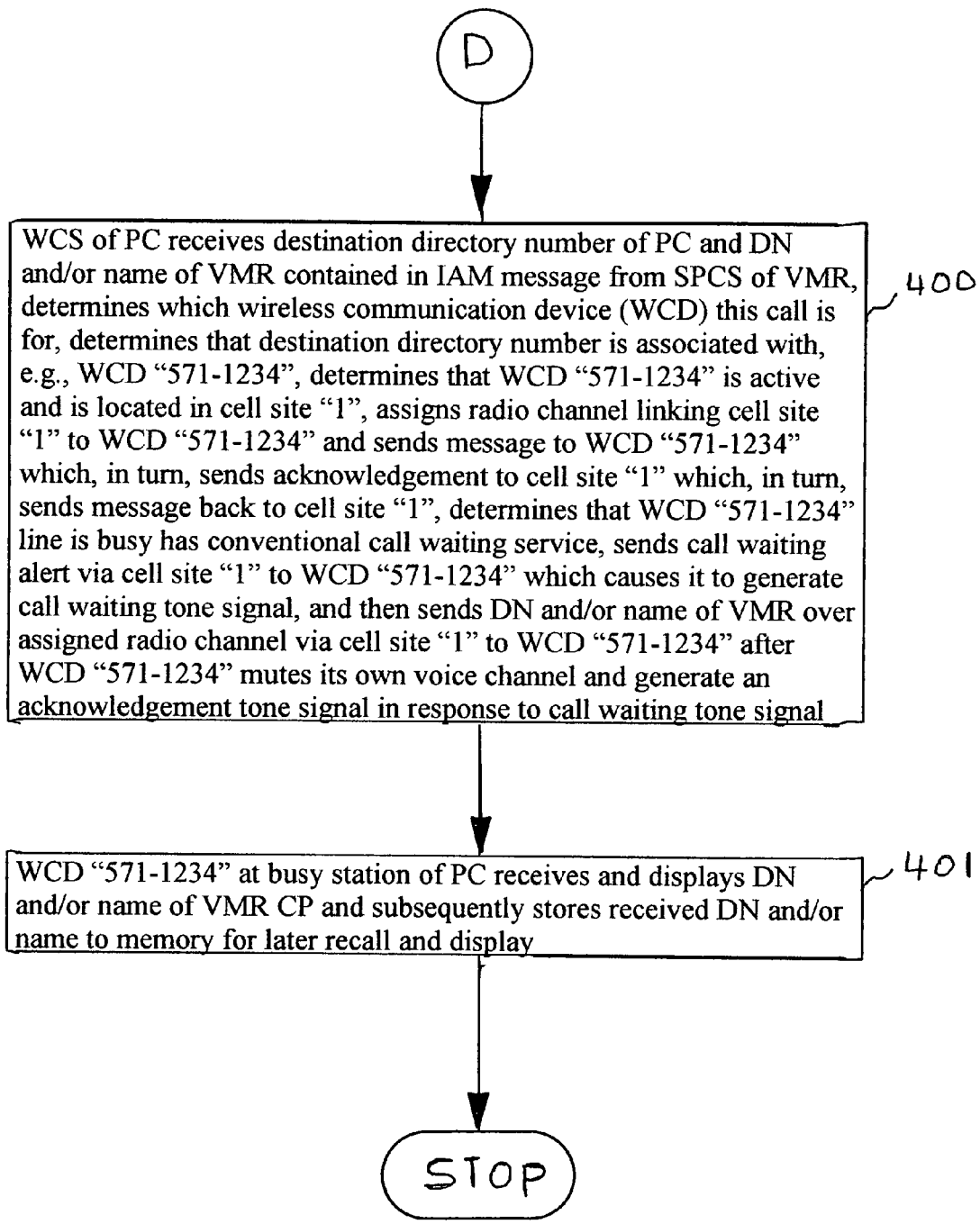
FIG. 4 shows, in flow chart form, still yet another embodiment of the present invention.

As illustrated in FIG. 4, step (400) the WCS associated with the previous caller after receiving the IAM message containing the destination directory number of the previous caller and the voice mail recipient's DN flagged as "public" (which indicates that the DN is to be disclosed at the previous caller's busy station) from the SPCS associated with the voice mail recipient via the PSTN, after determining that the received destination directory number is associated with WCD "571-1234" and that WCD "571-1234" is already busy on another call, and after determining that WCD "571-1234" is active and which cell site is the best serving cell, sends a call waiting alert to WCD "571-1234" on an assigned signaling channel which causes it to generate a call waiting signal and then, at approximately the same time or as part of normal call setup, sends the voice mail recipient's DN to WCD '571-1234" of the previous caller.

At step (401) WCD "571-1234" of the previous caller receives and displays in a display (not shown) the voice mail recipient's DN transmitted from the WCS associated with the previous caller and subsequently stores the received DN to memory (not shown) for later recall and display.

The voice mail system 503 depicted in FIG. 5 is connected via a pair of links 510 to a SPCS 500 which serves the voice mail recipient at station 504. Voice mail service is provided to the voice mail recipient 504 through the SPCS 500. The links carry voice calls as well as signaling information related to the DN of the voice mail recipient at station 504 and to the calling telephone number (e.g., a destination directory number) of the previous caller at station 505 (or at station 509) from the SPCS 500 to the voice mail system 503, as well as carry the signaling information, i.e., the DN of the voice mail recipient and the destination directory number of the previous caller, from the voice mail system 503 via the links 510, specifically via the packet data link (dotted lines), to the SPCS 500. The voice mail system itself has interoffice signaling capability and preferably the ability to send stored data (i.e., calling/called directory numbers) related to the voice mail recipient and to the previous caller from the voice mail recipient's mailbox via the packet data link to the SPCS 500 of the voice mail recipient after the voice mail recipient activates an automatic callback to the previous caller by entering a predetermined digit on an apparatus, or by saying a predetermined voice command, in response to a verbal announcement from the voice mail system while or after listening to a verbal announcement of a calling telephone number (destination directory number) and a recorded voice message of the previous caller left in the voice mail recipient's mailbox associated with the voice mail system. The interoffice signaling operates in accord with an accepted signaling protocol standard, preferably Signaling System 7 (SS7).

The above described voice mail system 503 is similar to existing voice mail type central messaging systems, as disclosed in U.S. Pat. No. 6,590,965 B1 to R. Andrew Poole et al., which is incorporated herein by reference, although other messaging systems could be used.

Each of the telephone central offices 500 and 501 depicted in FIG. 5 is suitably a Stored Program Controlled Switching System (SPCS) of the type as disclosed in U.S. Pat. No. 5,619,561 issued to Reese of Apr. 8, 1997, in U.S. Pat. No. 5,613,006 issued to Reese of Mar. 18, 1997, in U.S. Pat. No. 4,551,581 issued to Doughty of Nov. 5, 1985, and in U.S. Pat. No. 6,590,965 issued to R. Andrew Poole et al. of Jul. 8, 2003, which are incorporated herein by reference. One example of such a switching system is the currently in use 5ESS type switch manufactured by Lucent Technologies; but other vendors, such as Nortel and Siemens, manufacture comparable digital switches that could be used with the invention. The aforementioned citations are incorporated herein by reference and may be referred to for a more comprehensive understanding of the construction and operation of SPCS 500 and SPCS 501, but a brief description will be given herein to illustrate how the invention functions within the switching system.

Referring now to SPCS 500 which serves the voice mail recipient at station 504, the majority of the logic, control, storage, supervisory, and translation functions required for the operation of this system are performed by a central processor (not shown). A typical central processor suitable for use in the illustrative switching system is described in "The Bell System Technical Journal", Volume 56, No. 2, February, 1977, which is incorporated herein by reference. The central processor (not shown) is a data processing facility and can be functionally divided into central control (not shown), call store (not shown), and program store (not shown) plus maintenance apparatus (not shown).

Call store is a memory for storing translation and routing information in addition to temporary information relating to calls in progress and special services. This temporary information includes the busy/idle (off-hook/on-hook) status of telephone stations and circuits, calling/called station directory telephone numbers, special service indicators, etc.

Program store is a memory for storing the program instructions which direct the central control to sequentially perform its many functions.

Central control is the information processing unit of the system and executes the program instructions listed in program store using information temporarily stored in call store.

The processor interfaces with lines, trunks, and service circuits via scanners (all not shown) and distributor (not shown). The distributor responds to an order over a bus system from the central control to apply pulses to distributor points connected to peripheral units of equipment. For example, in response to an appropriate order, the distributor signals over the conductor (not shown) to actuate a data transmitter (not shown), the apparatus such as a relay in a trunk circuit (not shown), etc.

Scanners (not shown) are used to gather information for the central control by monitoring leads connected to the various peripheral units and telephone station such as 504. Thus, when a trunk circuit (not shown) changes state as a result of a seizure from a distant central office, a signal is transmitted via a conductor (not shown) to a scanner. Similarly, the scanner recognizes changes of state in a digit receiver (not shown) via the conductor in order to ascertain digits received from lines or trunks. Likewise, the scanners are used to recognize the busy/idle (off-hook/on-hook) condition of telephone station 504. Periodically, the scanners are addressed by central control over a bus system (not shown) to determine the state of the peripheral units and telephone station 504.

SPCS 501 which serves the previous caller basically comprises the same units of equipment as the SPCS 500 which serves the voice mail recipient and need not be described herein.

SPCS 500 and SPCS 501 are connected together and to Wireless Communication Switch (WCS) 507 via a common channel interoffice signaling (CCIS) system comprising terminals (not shown), data units (not shown), and a data link (not shown). The signaling system provides high speed data transmission facilities between the central processors of SPCS 500 and SPCS 501, as well as between the central processors of SPCS 500 and WCS 507, to carry all signaling, address, and network control information independently of the interoffice (not shown) talking paths. For instance, this information includes the identity of trunks used by the telephone customers as well as the previous caller and the voice mail recipient identification information. A typical example of a common channel interoffice signaling system which can be used in the present embodiment is disclosed in "The Bell System Technical Journal", Volume 57, No. 2, February, 1978, which is incorporated herein by reference.

According to the present invention, voice mail system 503 responds to a predetermined digit entered on a keypad of an apparatus at station 504, or to a spoken voice command, by the voice mail recipient so as to activate an automatic callback to a previous caller in response to a verbal announcement (prompt) from the voice mail system after or while listening to a verbal announcement of the previous caller's calling telephone number (destination directory number) and recorded voice message stored in the voice mail recipient's mailbox, by sending from the voice mail recipient's mailbox via a packet data link line (dotted line) 510 to SPCS 500 a data message containing the previous caller's stored destination directory number and the voice mail recipient's directory telephone number (DN) and/or name flagged as "public".

SPCS 500 of the voice mail recipient receives and temporarily stores in a call store (not shown) of the SPCS the data message containing the previous caller's destination directory number and the voice mail recipient's DN and/or name flagged as "public" (which indicates that the DN and/or name is to be disclosed at the previous caller's busy or idle station) from the voice mail system 503, disconnects from the voice mail system and connects audible ringing signals to the voice mail recipient's line, translates area and office codes of the received destination directory number of the previous caller into appropriate routing information to select a trunk line (not shown) of the SPCS 500 which is an appropriate route to either SPCS 501 which serves station 505 of the previous caller or to Wireless Communication Switch (WCS) 507 which serves Wireless Communication Device (WCD) 509 of the previous caller via cell site "1" (e.g. station 508), generates an Initial Address Message (IAM) which includes translation and routing information in addition to temporary information relating to calls in progress and special services, busy/idle (off-hook/on-hook) status of telephone station 504 and circuits (not shown), destination directory number of the previous caller and the DN and/or name of the voice mail recipient, special service indicators, etc., and then the distributor (not shown), in response to instructions from the processor (not shown), signals over the conductor (not shown) of SPCS 500 to actuate the data transmitter (not shown), which in turn, transmits the generated IAM message to the SPCS 501 associated with the previous caller, or to the WCS 507 associated with the previous caller, via the CCIS system.

SPCS 501 of the previous caller receives and temporarily stores in a call store (not shown) of the SPCS the IAM message, which includes translation and routing information, destination directory number of the previous caller and the voice mail recipient's DN and/or name flagged as "public", etc., from the SPCS 500 of the voice mail recipient during call setup. Central control (not shown) of the SPCS 501 responds to the receipt of the IAM message, as determined by the information stored in a translation table (not shown) in the call store, by executing a call processing software program in program store (not shown) of the SPCS associated with the off-hook call waiting procedure of the invention and it causes a multifrequency tone signal (e.g., a call waiting (CW) tone) to be transmitted to the previous caller at station 505 via a trunk link network (not shown) and the line link network (not shown).

The previous caller apparatus at station 505 detects the presence of the CW tone signal from the SPCS 501 and signals a microprocessor (not shown) of the apparatus which reacts by muting the microphone and earphone of the apparatus and then signaling a DTMF generator (not shown) of the apparatus to generate an acknowledgement tone signal on the previous caller loop so as to inform the SPCS 501 that it is an apparatus capable of receiving frequency shift keyed (FSK) data representative of the DN and/or name of the voice mail recipient. The acknowledgement tone signal is transmitted in a very quiet period on the previous caller loop since both the previous caller at station 505 and the other party at station 506 speech paths have been muted, the previous caller by its own apparatus and the other party by the SPCS 501 in a manner conventional for the call-waiting process.

Central control (not shown) of the SPCS 501 responds to the detection of the acknowledgement tone signal, as determined by the information stored in the translation table (not shown) in the call store of the SPCS 501, by executing a program in the program store of the SPCS 501 and it causes an order to be sent to the distributor (not shown) of the SPCS 501 which signals the data transmitter (not shown) of the SPCS 501 via the conductor (not shown) which, in turn, reacts by transmitting FSK data corresponding to the DN and/or name of the voice mail recipient from the call store of the SPCS 501 to the previous caller apparatus at station 505 during the very quiet period on the previous caller loop, as described, for example, in U.S. Pat. No. 5,619,561 issued to Reese, in U.S. Pat. No. 5,263,084 issued to Chaput et al., and in Bellcore Technical Reference TR-TSY-000575, Issue 1, October 1992 and Revision 1, December 1994. These citations are incorporated herein by reference. The signaling method, format and definition of the messages and parameters of the DN and/or name are defined in Bellcore Technical References TR-TSY-000030 and TR-TSY-000031. The standards requirement of a channel seizure tone is of course not required since the previous caller's apparatus is ready to receive. The FSK data corresponding to the voice mail recipient's DN and/or name is received by a FSK demodulator (not shown) of the apparatus which translates it to a digital stream that is fed to the microprocessor (not shown) of the apparatus which, in turn, translates the data into the DN and/or name of the voice mail recipient displayed in a display (not shown) of the apparatus, as described in U.S. Pat. No. 5,619,561 issued to Reese, entitled "Call-Waiting and Caller Identification With Three-Way Conversations Arrangements", in U.S. Pat. No. 5,263,084 issued to Chaput et al., entitled "Spontaneous Caller Identification With Call-Waiting", and in Bellcore Technical Reference TR-NWT-000575, Issue 1, October 1992, entitled "Calling Identity Delivery on Call Waiting", which are incorporated herein by reference.

Alternately, central control (not shown) of the SPCS 501 of the previous caller responds to the receipt of the IAM message, as determined by the information stored in the translation table (not shown) in the call store (not shown), by executing a software program in the program store (not shown) of the SPCS associated with an incoming call procedure of the invention and it causes station 505 of the previous caller to be selectively connected through the line and trunk networks (not shown) to a ringing circuit (not shown) which transmits intermittent ringing signals to the connected station 505. Between each pair of ringing signals is a silent interval or, more particularly, a period of time in which a ringing signal is not present. Consequently, station 505 of the previous caller receives a two second burst of a 20-hertz ringing signal followed by four seconds of silence. This sequence of ringing and silence is repeated until the previous caller at station 505 answers or the voice mail recipient abandons the automatic callback to the previous caller by going on-hook (e.g., hangs up). Connected to each of the ringing circuits is a ringing source (not shown) for generating the ringing signals. Coupling the ring circuits to the trunk link network (not shown) is a data transmitter (not shown) which sends data messages from the processor (not shown) to the connected station 505 during the silent interval between ringing signals, preferably between the first and second ringing signals, as described, for example, in U.S. Pat. No. 4,551,581 to Doughty, which is hereby incorporated by reference. These data messages include special service information such as the DN and/or name of the voice mail recipient. The DN and/or name of the voice mail recipient is received and displayed in a display (not shown) on an apparatus at the previous caller's station 505 and subsequently stored in a memory (not shown) of the apparatus for later recall and display, as described, for example, in U.S. Pat. No. 4,582,956 issued to Doughty, which is hereby incorporated by reference.

Referring now to WCS 507 which serves the previous caller at station 509 via cell site "1" at station 508. The WCS 507, in response to the receipt of the IAM message from the SPCS 500 which serves the voice mail recipient at station 504, determines which wireless communication device (WCD) this call is for by performing a table lookup (not shown) using the destination directory number (calling telephone number) of the previous caller. The WCS 507 then determines that this particular destination directory number, e.g., "571-1234," is associated with WCD 509 as shown in the table lookup. No further use is made of the destination directory number. The WCS 507 sends a paging message via the data links (not shown) to all cell sites to cause the cell sites to determine if the WCD "571-1234" is active and, if so, which cell is the best serving cell.

In response to the page message, the WCD 509 sends a page response message, as is known in the art. In this example, the WCD '571-1234" is located in cell "1" at station 508. The cell "1" receives the page response message from the WCD "571-1234" and forwards it via a data link (not shown) to the WCS 507. A radio channel (not shown) linking the cell site "1" to the WCD "571-1234" is then assigned, a message is sent to the WCD "571-1234" informing it of the radio channel. An acknowledgement message is sent back from the WCD "571-1234" to the cell site "1" at station 508. A message is then sent to the WCD "571-1234" to start ringing.

In a further embodiment, after the radio channel has been assigned, an analog encoded signal, such as dual tone multi-frequency (DTMF) encoding of the voice mail recipient's DN and/or name is delivered to the WCD "571-1234" of the previous caller at station 509 over the radio communication channel between ringing signals, preferably between the first and the second ringing signals. The analog encoded DN and/or name of the voice mail recipient is then translated (decoded) back into digits and/or alpha numeric characters and displayed at the WCD "571-1234" at station 509 on a display (not shown). Alternatively, frequency shift keyed signaling and conversion of the terminating called line identification (TCLID) could be used.

Call Waiting ID (sometimes referred to in this particular art as "Caller ID with Call Waiting") for cellular telephones may be implemented unambiguously by using this present invention to uniquely identify the WCD to which the previous caller is associated with. For example, when the destination directory number of the previous caller contained in the IAM message comes in to the WCS 507 of the previous caller from the SPCS 500 of the voice mail recipient, and the WCD "571-1234" of the previous caller is already busy on another call, the WCS 507 sends a call waiting alert via the cell site "1" at station 508 to the WCD "571-1234" of the previous caller at station 509 on a signaling channel which causes it to generate a call waiting tone signal. At approximately the same time or following the call waiting tone signal, a message containing the voice mail recipient's DN and/or name is sent to the WCD "571-1234" and displayed on a display (not shown), as described in Doughty, U.S. Pat. No. 4,582,956, which issued Apr. 15, 1986, and which is incorporated herein by reference.

The above described Wireless Communication Switch 507 architecture is similar to existing Wireless Communication Switches, such as disclosed in U.S. Pat. No. 6,590,965 to R. Andrew Poole, et al., and in U.S. Pat. No. 5,371,781 to Ardon, which are incorporated herein by reference, although other Wireless Communication Switch architectures could be used.

It is to be understood that the above-described embodiments are merely illustrative principles of the invention, and that many variations may be devised by those skilled in this particular art without departing from the scope of the invention. It is, therefore, intended that such variations be included within the scope of the claims.

What is claimed is:

1. A method for sending to a busy station of a previous caller whose calling telephone number (destination directory number) and recorded voice message have been left in a voice mail recipient (VMR) mailbox a directory telephone number (DN) and/or name of said VMR after said VMR activates an automatic callback to the previous caller, said mailbox of said VMR is associated with a voice mail system (VMS) which is coupled to a stored program controlled switching system (SPCS) of said VMR, comprising the steps of:

(a) said VMS sends to said SPCS of said VMR a data message containing calling/called information such as said destination directory number of the previous caller and said DN and/or name of said VMR after said VMR enters a predetermined digit on a keypad of an apparatus at said VMR station to activate the automatic callback to the previous caller in response to a verbal announcement from said VMS after or while listening to a verbal announcement of the previous caller destination directory number and recorded voice message left in said VMR mailbox;

(b) said SPCS of said VMR receives from said VMS the data message containing said destination directory number of the previous caller and said DN and/or name of said VMR and stores said received data message in a call store of said SPCS, disconnects from said VMS and connects audible ringing signals to said VMR line, translates area and office codes of said destination directory number stored in the call store into appropriate routing information to select a trunk line which is an appropriate route to a stored program controlled switching system (SPCS) of the previous caller, generates an initial address message (IAM) which includes said destination directory number of the previous caller and said DN and/or name of said VMR, and then transmits said IAM message to said SPCS of the previous caller; and (c) said SPCS of the previous caller, in response to receiving said destination directory number of the previous caller contained in said IAM message, stores said received IAM message in a call store of said SPCS, determines that the previous caller line is busy and has conventional call waiting ID service, sends a subscriber alerting signal (SAS) and a CPE alerting signal (CAS) to the previous caller busy station, and then sends said DN and/or name of said VMR from the call store of said SPCS to said busy station after an apparatus at said busy station mutes its own voice channel and generates an acknowledgement tone in response to said CAS.

2. The method as set forth in claim 1, further comprising the steps of:

(d) receiving by the apparatus at said busy station said DN and/or name of said VMR from said SPCS of said previous caller and displaying said received DN and/or name on a display; and (e) storing said received DN and/or name of said VMR to memory for later recall and display.

3. A method as set forth in claim 1, wherein the apparatus at said VMR station is a wired or wireless communication device such as a pushbutton telephone or other receiving and sending equipment.

4. A method as set forth in claim 1, wherein the apparatus at said busy station is a communication device such as a pushbutton telephone or other receiving and sending equipment for use with conventional services such as caller ID, caller ID with call waiting ID and other related services.

5. A method as set forth in claim 1, wherein said SPCS of said VMR is telephone or cellular company central office equipment.

6. A method as set forth in claim 1, wherein said SPCS of the previous caller is telephone or cellular company central office equipment.

7. A method as set forth in claim 1, wherein step (a) comprises the step of said VMR says a voice command to activate the automatic callback to the previous caller.

8. A method for sending to an idle station of a previous caller whose calling telephone number (destination directory number) and recorded voice message have been left in a voice mail recipient (VMR) mailbox a directory telephone number (DN) and/or name of said VMR after said VMR activates an automatic callback to the previous caller, said mailbox of said VMR is associated with a voice mail system (VMS) which is coupled to a stored program controlled switching system (SPCS) of said VMR, comprising the steps of:

(a) said VMS sends to said SPCS of said VMR a data message containing calling/called information such as said destination directory number of the previous caller and said DN and/or name of said VMR after said VMR enters on a keypad of an apparatus to activate the automatic callback to the previous caller in response to a verbal announcement from said VMS after or while listening to a verbal announcement of said destination directory number and said recorded message that were left in said VMR mailbox by the previous caller;

(b) said SPCS of said VMR receives from said VMS the data message containing said destination directory number of the previous caller and said DN and/or name of said VMR and stores said received data message in a call store of said SPCS, disconnects from said VMS and connects audible ringing signals to said VMR line, translates area and office codes of said destination directory number stored in the call store into appropriate routing information to select a trunk line which is an appropriate route to a stored program controlled switching system (SPCS) of the previous caller, generates an initial address message (IAM) which includes said destination directory number of the previous caller and said DN and/or name of said VMR, and then transmits said generated IAM message to said SPCS of the previous caller; and (c) said SPCS of the previous caller receives said IAM message containing said destination directory number of the previous caller and said DN and/or name of said VMR from said SPCS and then stores said IAM message in a call store of said SPCS, connects to the previous caller idle line with intermittent ringing signals, and then transmits said DN and/or name of said VMR from the call sore of said SPCS to the previous caller idle station during a silent interval between said ringing signals, preferably between first and second ringing signals.

9. The method as set forth in claim 8, further comprising the steps of:
   (d) receiving by an apparatus at the previous caller idle station during the silent interval between said ringing signals said DN and/or name of said VMR from said SPCS of the previous caller and displaying said received DN and/or name on a display; and
   (e) storing said received DN and/or name in memory for later recall and display.

10. A method as set forth in claim 9, wherein the apparatus at the previous caller idle station is a communication device such as a pushbutton telephone or other receiving and sending equipment capable for use with conventional telephone services such as caller ID, caller ID with call waiting and other related services.

11. A method as set forth in claim 8, wherein said SPCS of said VMR is telephone or cellular company central office equipment.

12. A method as set forth in claim 9, wherein said SPCS of the previous caller is telephone or cellular company central office equipment.

13. A method for sending a directory telephone number and/or name of a voice mail recipient (VMR) to an idle station of a previous caller whose calling telephone number (destination directory number) and recorded voice message have been left in said VMR mailbox after said VMR activates an automatic callback to the previous caller, said mailbox of said VMR is associated with a voice mail system (VMS) which is coupled to a stored program controlled switching system (SPCS) of said VMR, comprising the steps of:
   (a) said VMS sends to said SPCS of said VMR a data message containing calling/called information such as said destination directory number of the previous caller and said DN and/or name of said VMR after said VMR enters a predetermined digit on a keypad of an apparatus at said VMR station to activate the automatic callback to the previous caller in response to a verbal announcement from said VMS after or while listening to said recorded voice message and a verbal announcement of said destination directory number of the previous caller that were left in said VMR mailbox;
   (b) said SPCS of said VMR receives from said VMS the data message containing said destination directory number of the previous caller and said DN and/or name of said VMR and then stores said destination directory number and said DN and/or name in a call store of said SPCS, disconnects from said VMS and connects audible ringing signals to said VMR line, translates area and office codes of said destination directory number into appropriate routing information to select a trunk line which is an appropriate route to a wireless communication switch (WCS) of the previous caller, generates an initial address message (IAM) which includes said destination directory number and said DN and/or name, and then transmits said IAM message through a public switched telephone network (PSTN) to said WCS of the previous caller;
   (c) said WCS of the previous, in response to receiving said destination directory number of the previous caller and said DN and/or name of said VMR contained in said IAM message from said SPCS of said VMR, determines which wireless communication device (WCD) this call is for, determines that said destination directory number is associated with WCD "571-1234", determines that said WCD "571-1234" is active and is located in cell site "1", assigns a radio channel linking said cell site "1" to said WCD "571-1234", and then sends a message to said WCD "571-1234" informing it that the radio channel has been assigned;
   (d) said WCD "571-1234" responds to the message from said WCS by sending an acknowledgement message back to said cell site "1" which, in turn, sends a message back to said WCD "571-1234" to start ringing; and
   (e) said WCS of the previous caller sends said DN and/or name of said VMR over said assigned radio channel to said WCD "571-1234" at the previous caller station between ringing signals, preferably between first and second ringing signals.

14. The method as set forth in claim 13, further comprising the steps of:
   (f) receiving by said WCD "571-1234" at the previous caller station said DN and/or name of said VMR from said WCS of the previous caller and displaying said received DN and/or name on a display; and
   (g) storing said received DN and/or name to memory for later recall and display.

15. A method as set forth in claim 13, wherein said WCD "571-1234" at the previous caller station is a wireless device such as a cellular mobile telephone, a cellular car telephone or other receiving and sending equipment.

16. A method as set forth in claim 13, wherein said WCS of the previous caller is cellular company central office equipment.

17. A method for sending to a busy station of a previous caller whose calling telephone number and recorded voice message have been left in a voice mail recipient (VMR) mailbox a directory telephone number (DN) and/or name of said VMR after said VMR activates an automatic callback to the previous caller, said mailbox is associated with a voice mail system (VMS) which is coupled to a stored program controlled switching system (SPCS) of said VMR, comprising the steps of:
   (a) said VMS sends to said SPCS of said VMR a data message containing calling/called information such as said destination directory number of the previous caller and said DN and/or name of said VMR after said VMR enters a predetermined digit on a keypad of an apparatus at said VMR busy station to activate the automatic callback to the previous caller in response to a verbal announcement from said VMS after or while listening to a verbal announcement of the previous caller destination directory number and recorded voice message left in said VMR mailbox;
   (b) said SPCS of said VMR receives from said VMS the data message containing said destination directory number of the previous caller and said DN and/or name of said VMR and stores said received data message in a call store of said SPCS, disconnects from said VMS and connects audible ringing signals to said VMR line, translates area and office codes of said destination directory number stored in the call store into appropriate routing information to select a trunk line which is an appropriate route to a wireless communication switch (WCS) of the previous caller, generates an initial address message (IAM) which includes said destination directory number of the previous caller and said DN and/or name of said VMR, and then transmits said IAM message to said WCS of the previous caller;
   (c) said WCS of the previous caller, in response to receiving said destination directory number of the previous caller contained in said IAM message, determines which wireless communication device (WCD) this call is for, determines that said destination directory number is associated with WCD "571-1234", determines that said WCD "571-1234" is active, is located in cell site "1", assigns a radio channel linking said cell site "1" to said WCD "571-1234", determines that the previous caller line is busy and has conventional call waiting service, sends a call waiting alert via said cell site "1" to said WCD "571-1234" which causes it to generate a call waiting tone signal, and then sends over said assigned radio channel via said cell site "1" to said WCD "571-1234" said DN and/or name of said VMR.

18. The method as set forth in claim 17, further comprising the steps of:
  (d) receiving by said WCD "571-1234" at the previous caller busy station said DN and/or name of said VMR from said WCS of said previous caller following the call waiting tone signal and displaying said received DN and/or name on a display; and
  (e) storing said received DN and/or name in memory for later recall and display.

19. A method as set forth in claim 17, wherein said WCD "571-1234" is a wireless communication device such as a cellular mobile telephone, a cellular car telephone or other receiving and sending equipment.

20. A method as set forth in claim 17, wherein said WCS is cellular company central office equipment.

21. An automatic callback and caller ID system, comprising:
  (a) a voice mail system (VMS) which is coupled to a stored program controlled switching system (SPCS) of a voice mail recipient (VMR), which is connected via a public switched telephone network (PSTN) to a stored program controlled switching system (SPCS) of a previous caller;
  (b) said VMS having means for sending to said SPCS of said VMR a data message containing a calling telephone number (destination directory number) of the previous caller and a directory telephone number (DN) of said VMR after said VMR enters a predetermined digit on a keypad of an apparatus at said VMR station to activate an automatic callback to the previous caller in response to a verbal announcement from said VMS after or while listening to a verbal announcement of said destination directory number and a recorded voice message of the previous caller that were left in said VMR's mailbox associated with said VMS;
  (c) said SPCS of said VMR having means for receiving the data message containing said destination directory number of the previous caller and said DN of said VMR from said VMS and storing said received data message in a call store of said SPCS, disconnecting from said VMS and connecting audible ringing signals to said VMR line, translating area and office codes of said stored destination directory number into appropriate routing information to select a trunk line which is an appropriate route to said SPCS of the previous caller, generating an initial address message (IAM) which includes said destination directory number of the previous caller and said DN of said VMR, and then transmitting said IAM message to said SPCS of the previous caller;
  (d) said SPCS of the previous caller having means for receiving said IAM message from said SPCS of said VMR and storing said received IAM message containing said destination directory number of the previous caller and said DN of said VMR in a call store of said SPCS, determining that the previous caller line is busy, sending a subscriber alerting signal (SAS) and a CPE alerting signal (CAS) to the previous caller busy station, and then transmitting said DN of said VMR from the call store to the previous caller busy station after an apparatus at said busy station mutes its own voice channel and generates an acknowledgement tone in response to said CAS; and
  (e) the apparatus at said busy station of the previous caller having means for receiving said DN of said VMR from said SPCS of the previous caller, displaying said received DN on a display, and storing said DN to memory for later recall and display.

22. The system according to claim 21, wherein the apparatus at said busy station is a wired or wireless communication device such as a pushbutton telephone or other receiving and sending equipment.

23. The system according to claim 21, wherein the apparatus at said VMR station is a cellular phone or other receiving and sending equipment.

24. An automatic callback and caller ID system, comprising:
  (a) a voice mail system (VMS) which is coupled to a stored program controlled switching system (SPCS) of a voice mail recipient (VMR), which is connected via a public switched telephone network (PSTN) to a stored program controlled switching system (SPCS) of a previous caller;
  (b) said VMS having means for sending to said SPCS of said VMR a data message containing a calling telephone number (destination directory number) of the previous caller and a directory telephone number and/or name (DN) of said VMR after said VMR enters a predetermined digit on a keypad of an apparatus at said VMR station to activate an automatic callback to the previous caller in response to a verbal announcement from said VMS after or while listening to a verbal announcement of said destination directory number and a recorded voice message of the previous caller that were left in said VMR's mailbox associated with said VMS;
  (c) said SPCS of said VMR having means for receiving the data message containing said destination directory number of the previous caller and said DN of said VMR from said VMS and storing said received data message in a call store of said SPCS, disconnecting from said VMS and connecting audible ringing signals to said VMR line, translating area and office codes of said stored destination directory number into appropriate routing information to select a trunk line which is an appropriate route to said SPCS of the previous caller, generating an initial address message (IAM) which includes said destination directory number of the previous caller and said DN of said VMR, and then transmitting said generated IAM message via the appropriate route to said SPCS of the previous caller;
  (d) said SPCS of the previous caller having means for receiving said IAM message containing said destination directory number of the previous caller and said DN of said VMR from said SPCS of said VMR and then storing said received IAM message in a call store of said SPCS of the previous caller, connecting to the previous caller idle line with intermittent ringing signals, and then transmitting said DN of said VMR from the call store to an apparatus at the previous caller idle station during a silent interval between said ringing signals, preferably between first and second ringing signals; and
  (e) the apparatus at the previous caller idle station having means for receiving said DN of said VMR from said SPCS of the previous caller during the silent interval between said ringing signals, displaying said received DN on a display, and then storing said DN to memory for later recall and display.

25. The system according to claim 24, wherein the apparatus at said VMR station is a cellular phone or other receiving and sending equipment.

26. The system according to claim 24, wherein the apparatus at the previous caller idle station is a wired or wireless communication device such as a pushbutton telephone or other receiving and sending equipment.

27. An automatic callback and caller ID system, comprising:
   (a) a voice mail system (VMS) which is coupled to a stored program controlled switching system (SPCS) of a voice mail recipient (VMR), which is connected via a public switched telephone network (PSTN) to a mobile telephone switching office (MTSO) of a previous caller;
   (b) said VMS having means for transmitting to said SPCS of said VMR a data message containing a calling telephone number (destination directory number) of the previous caller and a directory telephone number and/or name (DN) of said VMR after said VMR enters a predetermined digit on a keypad of an apparatus at said VMR station to activate an automatic callback to the previous caller in response to a verbal announcement from said VMS after or while listening to a verbal announcement of said destination directory number and a recorded voice message of the previous caller that were left in said VMR's mailbox associated with said VMS;
   (c) said SPCS of said VMR having means for receiving the data message containing said destination directory number of the previous caller and said DN of said VMR from said VMS and storing said received data message in a call store of said SPCS, disconnecting from said VMS and connecting audible ringing signals to said VMR line, translating area and office codes of said stored destination directory number into appropriate routing information to select a trunk line which is an appropriate route to said MTSO of the previous caller, generating an initial address message (IAM) which includes said destination directory number of the previous caller and said DN of said VMR, and then transmitting said generated IAM message via the appropriate route to said MTSO of the previous caller;
   (d) said MTSO of the previous caller having means for receiving said IAM message containing said destination directory number of the previous caller and said DN of said VMR from said SPCS of said VMR, determining which wireless communication device (WCD) this call is for, determining that said destination directory number contained in said IAM message is associated with said WCD "571-1234" of the previous caller, determining that said WCD "571-1234" is active and is located in cell site "1", assigning a radio channel linking said cell site "1" to said WCD "571-1234", sending a message to said WCD "571-1234" informing it that the radio channel has been assigned after said WCD "571-1234" responds to the message from said MTSO by sending an acknowledgement message back to said cell site "1" which, in turn, sends a message back to said WCD "571-1234" to start ringing, and then transmitting said DN of said VMR over said assigned radio channel to said WCD "571-1234" of the previous caller, preferably between first and second ringing signals; and
   (e) said WCD "571-1234" of the previous caller having means for receiving said DN of said VMR from said MTSO of the previous caller, displaying said received DN on a display, and then storing said DN to memory for later recall and display.

28. The system according to claim 27, wherein said WCD "571-1234" of the previous caller is a cellular phone or other receiving and sending equipment.

29. The system according to claim 27, wherein the apparatus at said VMR station is a cellular phone or other receiving and sending equipment.

30. An automatic callback and caller ID system, comprising:
   (a) a voice mail system (VMS) which is coupled to a stored program controlled switching system (SPCS) of a voice mail recipient (VMR), which is connected via a public switched telephone network (PSTN) to a mobile telephone switching office (MTSO) of a previous caller;
   (b) said VMS having means for sending to said SPCS of said VMR a data message containing a calling telephone number (destination directory number) of the previous caller and a directory telephone number and/or name (DN) of said VMR after said VMR enters a predetermined digit on a keypad of an apparatus at said VMR station to activate an automatic callback to the previous caller in response to a verbal announcement from said VMS after or while listening to a verbal announcement of said destination directory number and a recorded voice message of the previous caller that were left in said VMR's mailbox associated with said VMS;
   (c) said SPCS of said VMR having means for receiving the data message containing said destination directory number of the previous caller and said DN of said VMR from said VMS and storing said received data message in a call store of said SPCS, disconnecting from said VMS and connecting audible ringing signals to said VMR line, translating area and office codes of said stored destination directory number into appropriate routing information to select a trunk line which is an appropriate route to said MTSO of the previous caller, generating an initial address message (IAM) which includes said destination directory number of the previous caller and said DN of said VMR, and then sending said generated IAM message via the appropriate route to said MTSO of the previous caller;
   (d) said MTSO of the previous caller having means for receiving said IAM message containing said destination directory number of the previous caller and said DN of said VMR from said SPCS of said VMR, determining which wireless communication device (WCD) this call is for, determining that said destination directory number contained in said IAM message is associated with said WCD "571-1234" of the previous caller, determining that said WCD "571-1234" is active and is located in cell site "1", assigning a radio channel linking said cell site "1" to said WCD "571-1234", determining that said WCD "571-1234" is busy, sending a call waiting alert via said cell site "1" to said WCD "571-1234" which causes it to generate a call waiting tone signal, and then sending said DN of said VMR over said assigned radio channel via said cell site "1" to said WCD "571-1234" of the previous caller; and
   (e) said WCD "571-1234" of the previous caller having means for receiving said DN of said VMR from said MTSO of said previous caller, displaying said received DN on a display, and storing said DN to memory for later recall and display.

31. The system according to claim 30, wherein said WCD "571-1234" of the previous caller is a cellular phone or other receiving and sending equipment.

32. The system according to claim 30, wherein the apparatus at said VMR station is a cellular phone or other receiving and sending equipment.

* * * * *